(12) United States Patent  (10) Patent No.: US 7,011,128 B2
Silverbrook et al.  (45) Date of Patent: Mar. 14, 2006

(54) PRINTER WITH BINDING ASSEMBLY

(75) Inventors: Kia Silverbrook, Balmain (AU); Tobin Allen King, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 4 days.

(21) Appl. No.: 10/933,285

(22) Filed: Sep. 3, 2004

(65) Prior Publication Data

US 2005/0022937 A1  Feb. 3, 2005

Related U.S. Application Data

(63) Continuation of application No. 10/322,450, filed on Dec. 19, 2002, now Pat. No. 6,827,116, which is a continuation of application No. 09/575,128, filed on May 23, 2000, now Pat. No. 6,502,614.

(30) Foreign Application Priority Data

May 25, 1999 (AU) .................................. PQ0559
Jun. 30, 1999 (AU) .................................. PQ1313
Feb. 24, 2000 (AU) .................................. PQ5829

(51) Int. Cl.
  *B42C 1/12* (2006.01)
  *B42C 9/00* (2006.01)
(52) U.S. Cl. ............... 156/384; 156/387; 156/578; 270/58.08; 358/1.1
(58) Field of Classification Search ........... 156/277, 156/384–388, 563, 578; 118/46; 271/33; 270/52.18, 1.01, 58.08; 412/33, 37; 347/20, 347/84, 85, 86; 358/1.1
See application file for complete search history.

(56) References Cited

U.S. PATENT DOCUMENTS

| 3,847,151 A | 11/1974 | D'Alessandro et al. |
| 4,343,673 A | 8/1982 | Smith et al. |
| 4,473,425 A | 9/1984 | Baughman et al. |
| 4,537,650 A | 8/1985 | Coons, Jr. |
| 4,611,741 A | 9/1986 | Wilson |
| 4,797,048 A | 1/1989 | Doery |
| 4,864,618 A | 9/1989 | Wright et al. |
| 4,905,054 A | 2/1990 | Rood |
| 5,051,736 A | 9/1991 | Bennett et al. |
| 5,108,244 A | 4/1992 | Bellanca |
| 5,152,622 A | 10/1992 | Rasmussen et al. |
| 5,443,249 A | 8/1995 | Rizzolo et al. |
| 5,477,012 A | 12/1995 | Sekendur |
| 5,652,412 A | 7/1997 | Lazzouni |

(Continued)

FOREIGN PATENT DOCUMENTS

EP  734864  10/1996

(Continued)

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

*Primary Examiner*—Sue A. Purvis

(57) ABSTRACT

A printer including a pagewidth printhead assembly and a binding assembly downstream of the printhead assembly, the binding assembly comprising a support chassis downstream of a printing zone of the printer, the support chassis defining a glue application and binding zone in which printed sheets of media are received in a feed direction; and an elongate glue applicator mounted on the chassis and positioned substantially at right angles to said feed direction, the applicator being displaceable towards and away from the sheets of media to apply a strip of glue to a transverse edge of each of said consecutive sheets of media.

5 Claims, 11 Drawing Sheets

U.S. PATENT DOCUMENTS

| | | |
|---|---|---|
| 5,661,506 A | 8/1997 | Lazzouni et al. |
| 5,692,073 A | 11/1997 | Cass |
| 5,782,466 A | 7/1998 | Regimbal et al. |
| 5,852,434 A | 12/1998 | Sekendur |
| 6,076,734 A | 6/2000 | Dougherty |
| 6,530,339 B1 | 3/2003 | Silverbrook |
| 6,591,884 B1 | 7/2003 | Silverbrook et al. |
| 6,644,642 B1 | 11/2003 | King et al. |
| 6,669,385 B1 | 12/2003 | King et al. |

FOREIGN PATENT DOCUMENTS

| | | |
|---|---|---|
| EP | 0567288 | 1/2000 |
| GB | 2306669 | 5/1997 |
| JP | 10-194566 | 7/1998 |
| WO | WO 99/18487 | 4/1999 |
| WO | WO 99/50787 | 10/1999 |

PRINTER WITH BINDING ASSEMBLY

CROSS-REFERENCES TO RELATED APPLICATIONS

This application is a Continuation application of U.S. application Ser. No. 10/322,450, filed on Dec. 19, 2002, now issued U.S. Pat. No. 6,827,116, which is a Continuation application of U.S. application Ser. No. 09/575,128, filed on May 23, 2000, now issued U.S. Pat. No. 6,502,614, all of which are herein incorporated by reference. Various methods, systems and apparatus relating to the present invention are disclosed in the following co-pending applications filed by the applicant or assignee of the present invention simultaneously with the present application:

| | | | |
|---|---|---|---|
| 09/575,197, | 09/575,195, | 09/575,159, | 09/575,132, |
| 09/575,123, | 09/575,148, | 09/575,130, | 09/575,165, |
| 09/575,153, | 09/575,118, | 09/575,131, | 09/575,116, |
| 09/575,144, | 09/575,139, | 09/575,186, | 6,681,045, |
| 6,728,000, | 09/575,145, | 09/575,192, | 09/575,181, |
| 09/575,193, | 09/575,156, | 09/575,183, | 09/575,160, |
| 09/575,150, | 09/575,169, | 6,644,642, | 6,502,614, |
| 6,622,999, | 6,669,385, | 6,549,935, | 09/575,187, |
| 6,727,996, | 6,591,884, | 6,439,706, | 09/575,196, |
| 09/575,198, | 6,290,349, | 6,428,155, | 09/575,146, |
| 09/575,174, | 09/575,163, | 6,737,591, | 09/575,154, |
| 09/575,129, | 09/575,124, | 09/575,188, | 09/575,189, |
| 09/575,162, | 09/575,172, | 09/575,170, | 09/575,171, |
| 09/575,161, | 6,428,133, | 6,526,658, | 6,315,399, |
| 6,338,548, | 6,540,319, | 6,328,431, | 6,328,425, |
| 09/575,127, | 6,383,833, | 6,464,332, | 6,390,591, |
| 09/575,152, | 6,328,417, | 6,409,323, | 6,281,912 |
| 6,604,810, | 6,318,920, | 6,488,422, | 09/575,108, |
| 09/575,109 | | | |

The disclosures of these co-pending applications are incorporated herein by cross-reference.

FIELD OF THE INVENTION

The present invention relates to printed media production and in particular to a binding assembly for a printer.

BACKGROUND OF THE INVENTION

With the advent of the Internet has come the opportunity for the print media industry to publish "on-line" rather than producing and distributing traditional paper based publications. On-line publishing has a number of advantages. From the consumer's point of view, information is available on demand, information can be navigated via hypertext links, information can be searched, and information can be automatically personalized. From the publisher's point of view, the costs of printing and physical distribution are eliminated and the publication becomes more attractive to advertisers as it can be targeted to specific demographics and linked to product sites.

On-line publication also has disadvantages. Computer screens are inferior to paper. At the same quality as a magazine page, a SVGA computer screen displays only about a fifth as much information. Both CRT's (Cathode Ray Tubes) and LCD's (Liquid Crystal Displays) have brightness and contrast problems, particularly when ambient light is strong. Ink on paper, being reflective rather than emissive is both bright and sharp in ambient light. Accordingly, people have a natural preference to read newspapers, magazines, catalogues, brochures and other publications in a bound paper based format.

Known digital printers, and in particular digital inkjet printers, do not make any provision for binding together the pages of printed media. Such an arrangement would conveniently provide for bound document production in the small office/home office (SOHO) environment. This would also permit some of the existing drawbacks of on-line publication to be addressed. However, in the SOHO environment space is often at a premium. Therefore, any provision for automatically binding separate pages into a bound document must not add a significant amount of extra space over that occupied by the printer.

SUMMARY OF THE INVENTION

It is an object of the present invention to provide means to bind pages of printed media into bound documents suitable for use in conjunction with a digital printer. Accordingly, the present invention provides a binding assembly for use with a digital printer having a support frame for mounting a printhead assembly for printing on pages of media, the binding assembly including:

a binding means mounted to the support frame wherein the binding means is adapted to bind the pages along a line substantially perpendicular to the direction of travel of the page with respect to the support frame.

Preferably, the binding means includes a glue sponge strip extending perpendicularly to the general direction of travel of the page with respect to the support frame. In a further preferred form, retractable fingers periodically extend into the paper path for temporarily stopping the page to allow the glue sponge strip to apply a line of adhesive to the page. In some embodiments of this form of the invention, the retractable fingers retract once the glue strip has applied adhesive to the page such that the page is gravity fed to a binding area where each page is sequentially adhered to the previous page. It is further preferred if the retractable fingers retract once the glue strip has applied adhesive to the page such that the page is gravity fed to a binding area where each page is sequentially adhered to the previous page.

It will be appreciated that the binding means according to this embodiment applies the adhesive directly prior to pressing the adhesive against the previous page. This is more effective than applying adhesive to the rear of each page and sequentially pressing each page to the subsequent page because any interruption in the printing process such as replenishing the paper supply may allow the adhesive applied to the last adhered page to deteriorate and become less effective.

In another preferred form, the glue sponge strip is adapted to receive adhesive from an adhesive supply by capillary action. In accordance with particularly preferred embodiments, the glue sponge strip is retained in a chamber adapted to seal the strip in an environment acceptable for maintaining adhesive performance when the strip is not in use. In these embodiments, a camshaft is provided to advance the glue strip through a closable aperture in the chamber into engagement with the surface of a page.

In some embodiments, the binding means includes an alignment means to align each page before it is adhered to the previous page. Preferably, the alignment means is a rotating cam positioned to engage the edge of each page and slide them into alignment.

In a particularly preferred embodiment, the printhead is adapted to print the full width of the page simultaneously.

Rectangular pages of media move through the printer in a "landscape" orientation wherein the long side of the page is perpendicular to the direction of page travel. As the pages move from a media storage area, such as the paper tray, to the binding area, the overall distance that each page travels is reduced simply because they are in "landscape" orientation as opposed to "portrait" orientation. Consequently, a printer that incorporates the binding assembly can have a relatively compact design instead of an elongate design, which may be awkward to accommodate, where space is limited. Notwithstanding the compact design, the present invention still produces documents bound along the long edge of the page such that the document is held and read in the commonly preferred "portrait" orientation.

The present invention also allows the production of printed material in the traditionally appealing form of a bound document rather than separate pages. With the aid of modem printers and computer network technology, the invention has many applications in on-line publication of newspapers, magazines, brochures and so on. The present invention will be described with particular reference to the netpage system. An overview of this system is set out below. It has been developed to allow a large number of distributed users to interact with networked information via printed matter and optical sensors thereby to obtain interactive printed matter on demand from high-speed networked color printers.

For this purpose, the Applicant has developed a range of netpage printers. Of these, the wallprinter is designed to be wall mounted in the area where the user would normally first consume the morning news such as in the kitchen or beside the breakfast table. In light of this, it is expected that the wallprinter will be one of the most widely used of the netpage printers and therefore it will be described in detail below to illustrate one specific embodiment of the invention. However, it will be appreciated that this is merely one example of the invention, which may be embodied in many other forms.

DETAILED DESCRIPTION OF PREFERRED AND OTHER EMBODIMENTS

Figures 1, 2:
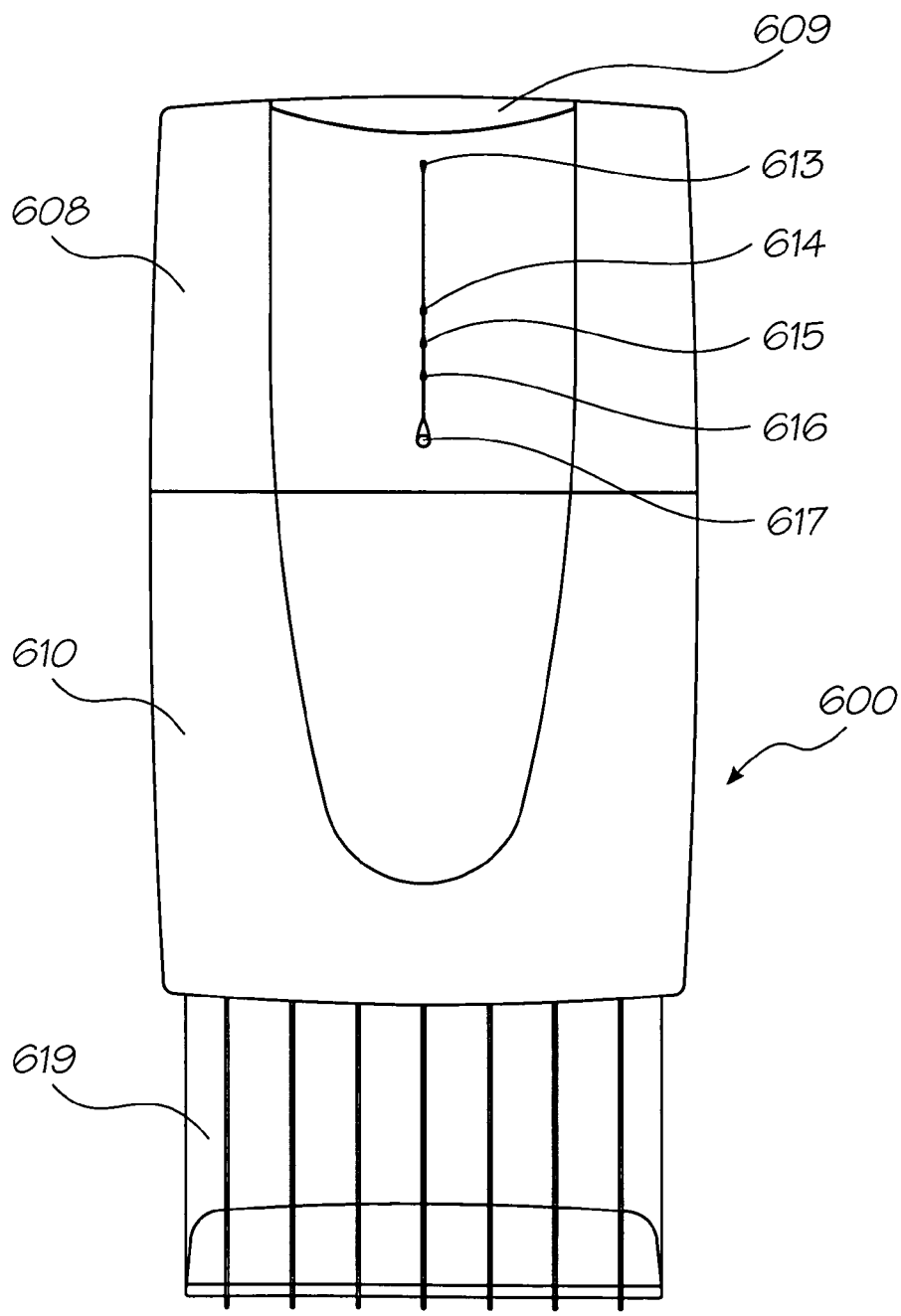
FIG. 1 shows a plan view of the wallprinter, that incorporates a binding assembly, in accordance with the invention.
FIG. 2 shows a front elevation of the wallprinter.

Note: Memjet™ is a trade mark of Silverbrook Research Pty Ltd, Australia.

In the preferred embodiment, the invention is configured to work with the netpage system, an overview of which follows. The system is described in this specification to reduce the need for external reference when attempting to understand the context in which the preferred embodiments and aspects of the present invention operate.

In its preferred form, the netpage system relies on the production of, and human interaction with, netpages. These are pages of text, graphics and images printed on ordinary paper, but which work like interactive Web pages. Information is encoded on each page using ink, which is substantially invisible to the unaided human eye. The ink, however, and thereby the encoded information, can be sensed by an optically imaging pen (the netpage pen) and transmitted to the netpage system.

In the preferred form, active buttons and hyperlinks on each page can be clicked with the netpage pen to request information from the network or to signal preferences to a network server. In one embodiment, text written by hand on a netpage is automatically recognized via the pen, allowing forms to be filled in. In other embodiments, signatures recorded on a netpage are automatically verified, allowing e-commerce transactions to be securely authorized.

The netpage pen works in conjunction with a netpage printer, an Internet-connected printing appliance for home, office or mobile use. The pen is wireless and communicates securely with the netpage printer via a short-range radio link.

The netpage printer delivers, periodically or on demand, personalized newspapers, magazines, catalogs, brochures and other publications, all printed at high quality as interactive netpages. Unlike a personal computer, the netpage printer is an appliance which can be, for example, wall-mounted adjacent an area where the morning news is first consumed, such as in a user's kitchen, near a breakfast table, or at the household's point of departure for the day. It also comes in tabletop, desktop, portable and miniature versions.

Netpages printed at their point of consumption combine the ease-of-use of paper with the timeliness and interactivity of an interactive medium.

The netpage system is made considerably more convenient because of the functional superiority of the netpage printers. At the heart of these printers are high-speed micro-electromechanical system (MEMS) based inkjet (Memjet™) printheads described in various co-pending and co-filed applications from the list above. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

A netpage printer prints pages of photographic-quality images and magazine quality text at a rate of over 30 double-sided sheets per minute (that is, more than 60 pages per minute). They come in a variety of forms, including wall-mounted versions, tabletop versions, portable versions, and pocket versions. Given the nature of the netpage system, it is envisaged that one of the most commercially relevant forms of netpage printer will be the wall mounted version referred to as wallprinter. For convenience, the present invention will be described in detail with reference to this specific version shown in the accompanying drawings.

Figure 4:
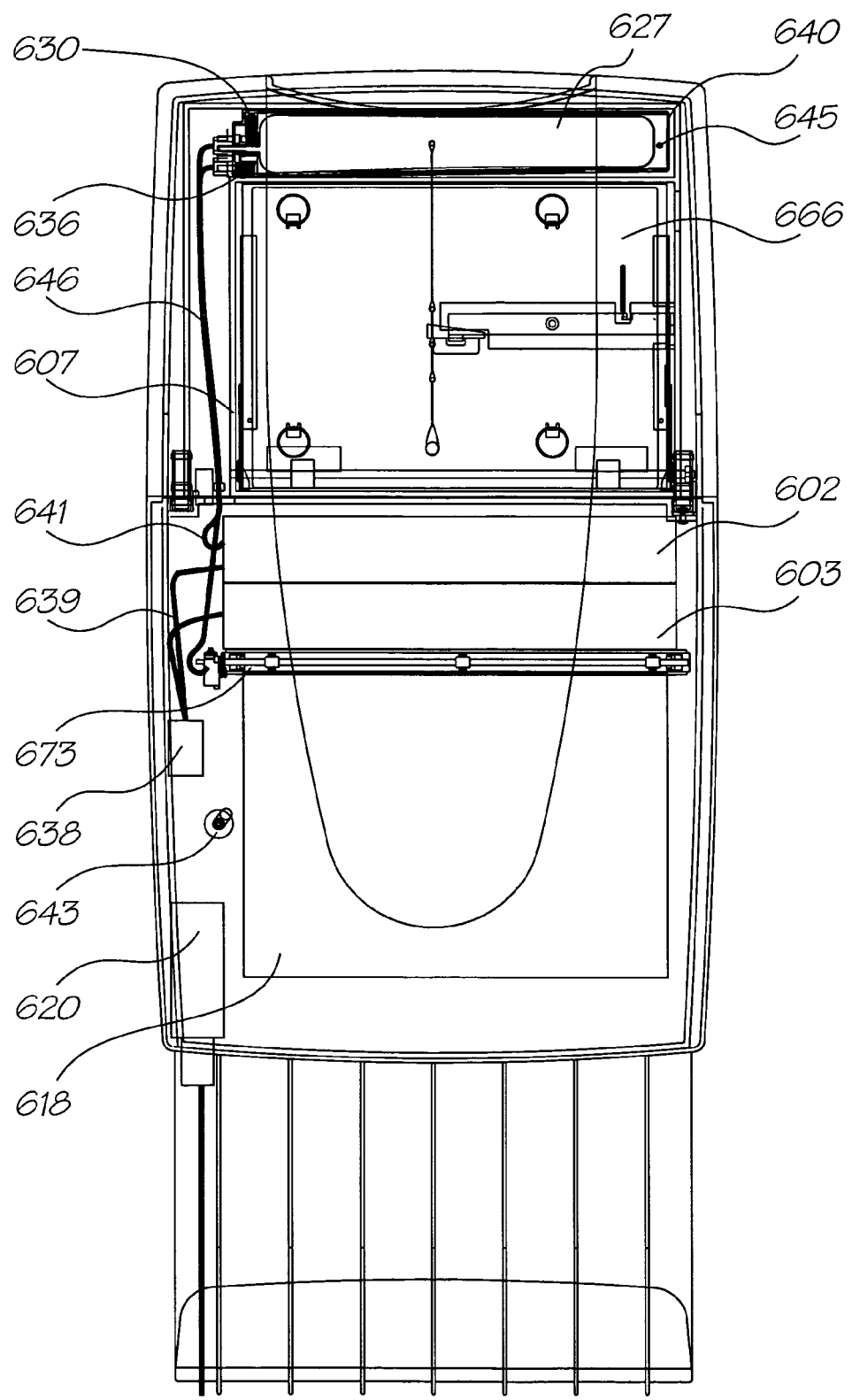
FIG. 4 shows a ghost view front elevation of the wallprinter.
Figure 5:
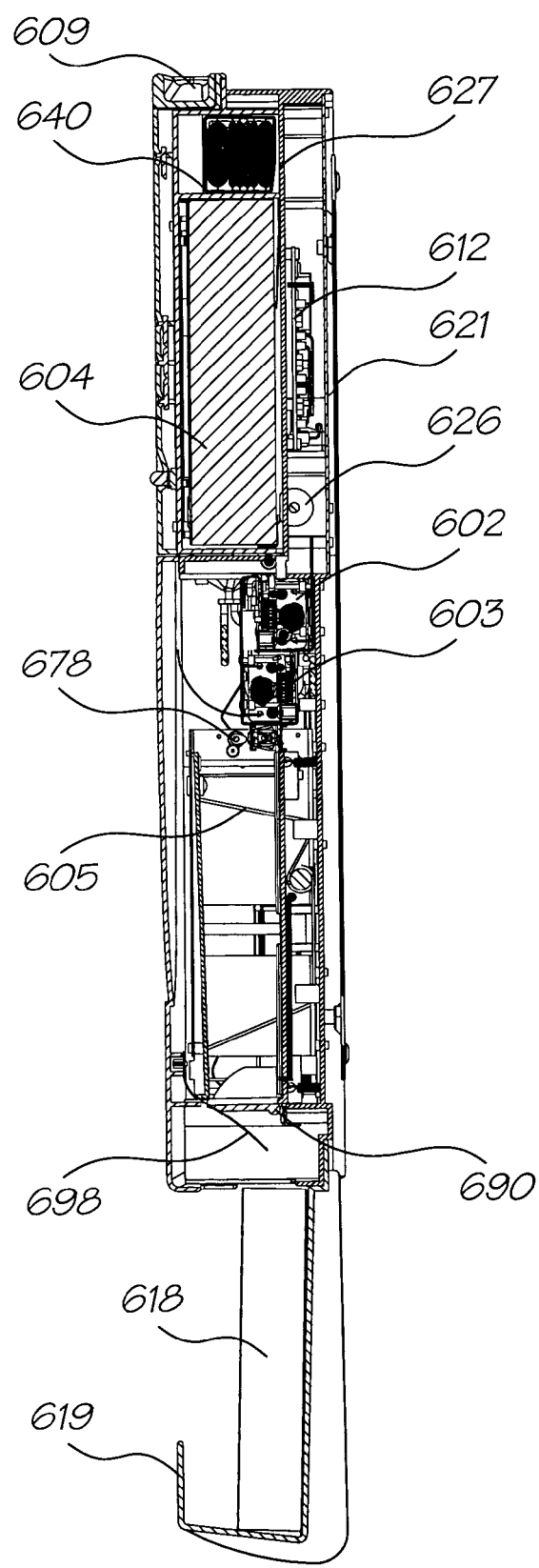
FIG. 5 shows a section view of the wallprinter.

The vertically-mounted netpage wallprinter 600 is shown fully assembled in FIGS. 1 and 2. As best shown in FIGS. 4 and 5, it prints netpages on A4 sized media using duplexed Memjet™ print engines 602 and 603. It uses a straight paper path with the paper 604 passing through duplexed print engines 602 and 603 which print both sides of a sheet simultaneously, in full color and with full bleed. A multi-DSP raster image processor (RIP) rasterizes pages to internal memory, and a pair of custom print engine controllers expand, dither and print page images to the duplexed printheads in real time.

A binding assembly, in accordance with the invention, is in the form of an integral binding assembly 605 that applies a strip of glue along one edge of each printed sheet, allowing it to adhere to the previous sheet when pressed against it. This creates a final bound document 618 which can range in thickness from one sheet to several hundred sheets. The binding assembly 605 will be considered in close detail below with particular reference to FIGS. 7 to 13.

Referring to FIGS. 1 to 7, the Wallprinter 600 consists of a main chassis 606, which accommodates all major components and assemblies. It has a pivoting media tray 607 in the front upper portion, which is covered by a front molding 608 and handle molding 609. The front molding 608, handle molding 609 and lower front molding 610 can vary in color, texture and finish to make the product more appealing to consumers. They simply clip onto the front of the wallprinter 600.

A flexible printed circuit board (flex PCB) runs from the media tray 607 to the main PCB 612. It includes four different color LEDs 613, 614, 615 and 616 and a push button 617. The LEDs show through the front molding and indicate "on" 613, "ink out" 614, "paper out" 615, and "error" 616. The push button 617 elicits printed "help" in the form of usage instructions, printer and consumable status information, and a directory of resources on the netpagenetwork.

Printed, bound documents 618 exit through the base of the wallprinter 600 into a clear, plastic, removable collection tray 619. This is discussed in greater detail below with specific reference to FIG. 7.

Figure 6:
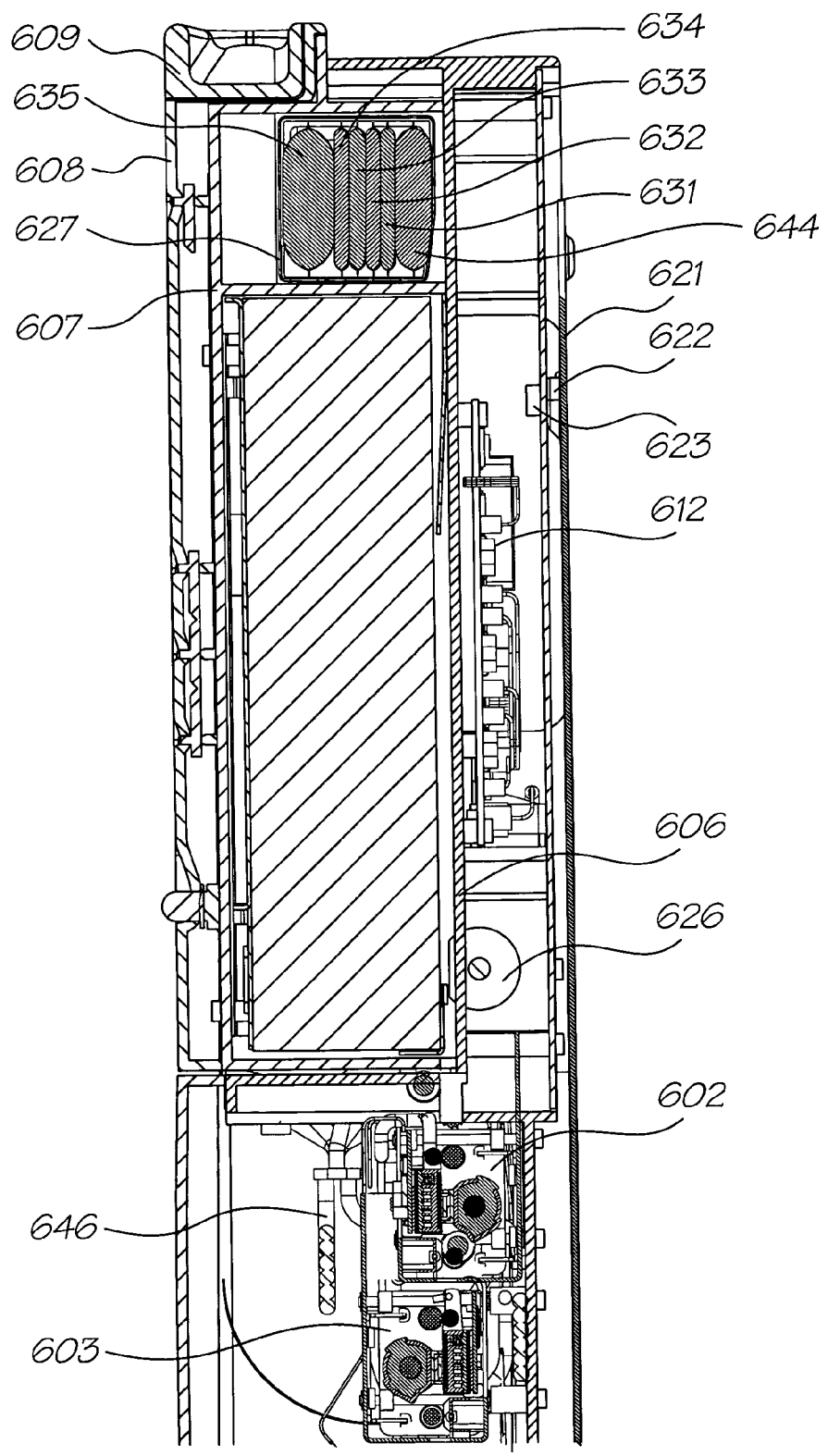
FIG. 6 shows an enlarged section view of an upper part of the wallprinter.

The wallprinter 600 is powered by an internal 110V/220V power supply 620 and has a metal mounting plate 621 that is secured to a wall or stable vertical surface by four screws. Plunged keyhole slot details 622 in the metal plate 621 allow for four spigots mounted on the rear of the printer to hook onto the plate. As best shown in FIG. 6, the wallprinter 600 is prevented from being lifted off by a screw 623 that locates the chassis molding 606 to the plate 621 at one position behind the media tray 607.

Figure 3:
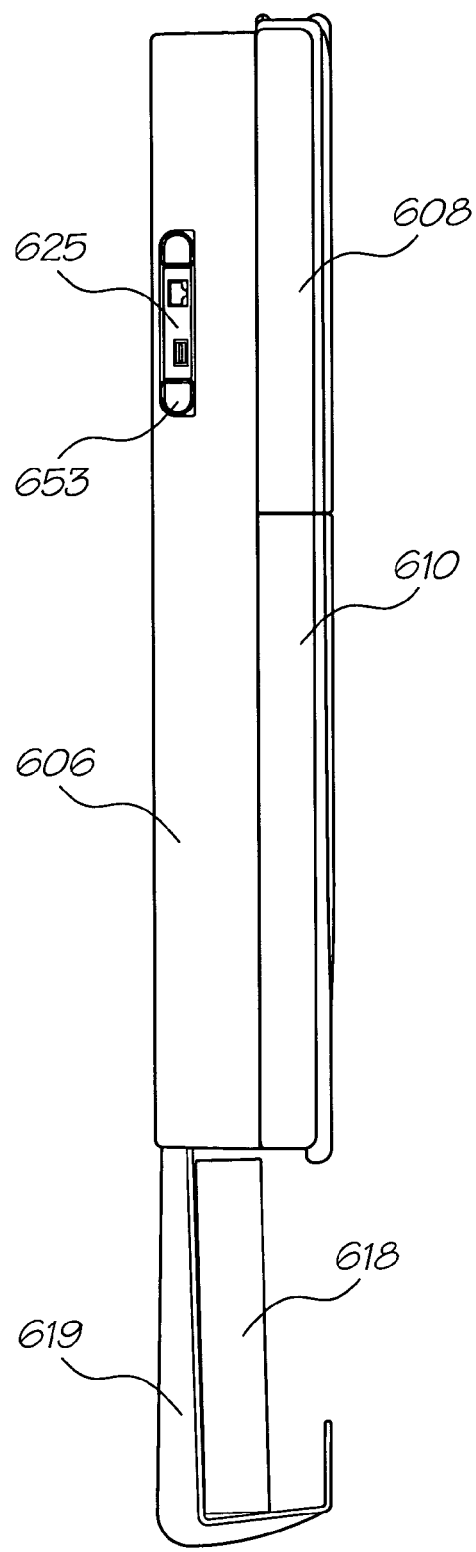
FIG. 3 shows a left side elevation of the wallprinter.

Referring to FIG. 3, the side of the wallprinter 600 includes a module bay which accommodates a network interface module 625 which allows the printer to be connected to the netpage network and to a local computer or network. The interface module 625 can be selected and installed in the factory or in the field to provide the interfaces required by the user. The modules may have common connector options, such as: IEEE 1394 (Firewire) connection, standard Centronics printer port connection or a combined USB2 and Ethernet connection. This allows the consumer to connect the wallprinter 600 to a computer or use it as a network printer. The interface module PCB (with gold contact edge strips) plugs directly into the main wallprinter PCB 612 via an edge connector. The different connector configurations are accommodated in the module design by use of a tool insert. Finger recesses 653 on either side of the module 625 allow for easy manual insertion or removal.

The main PCB 612 is attached to the rear of the chassis 606. The board 612 interfaces through the chassis molding 606 to the interface module 625. The PCB 612 also carries the necessary peripheral electronics to the Memjet™ printheads. This includes a main CPU with two 32 MB DRAMs, flash memory, IEEE 1394 interface chip, six motor controllers, various sensor connectors, interface module PCB edge connector, power management, internal/external data connectors and a QA chip.

Referring to FIGS. 4 and 5, paper 604 is placed into a hinged top tray 607 and pressed down onto a sprung platen 666. The tray 607 is mounted to the chassis 606 via two hinges (not shown).

The paper 604 is positioned under edge guides before being closed and is automatically registered to one side of the tray by action of a metal spring part. An ink cartridge 627 connects into an ink connector molding via a series of self-sealing connectors. The connectors transmit ink, air and glue to their separate locations. The ink connector molding contains a sensor, which detects a QA chip on the ink cartridge and verifies identification prior to printing. When the front hatch is sensed closed, a release mechanism allows the sprung platen 666 to push the paper 604 against a motorized media pick-up roller assembly 626.

FIG. 6 shows a section through the replaceable ink cartridge 627. It has bladders or chambers for storing fixative 644, and cyan 631, magenta 632, yellow 633, black 634 and infrared 635 inks. As shown in FIG. 4, the cartridge 627 also contains a micro air filter 636 and an adhesive bladder 630 in a base molding. The micro air filter 636 interfaces with an air pump 638 inside the printer via a hose. This provides filtered air to the printheads to prevent ingress of micro particles into the Memjet™ printheads which may clog the nozzles. By incorporating the air filter 636 within the cartridge 627, the operational life of the filter is effectively linked to the life of the cartridge. This ensures that the filter is replaced together with the cartridge rather than relying on the user to clean or replace the filter at the required intervals.

The cartridge 627 has a thin wall casing 640. The ink bladders 631 to 635 and fixitive bladder 644 are suspended within the casing by a pin 645 which hooks the cartridge together. This is a fully recyclable product with a capacity for printing and gluing 3000 pages (1500 sheets).

The motorized media pick-up roller assembly 626 pushes the top sheet directly from the media tray 607 past a paper sensor (not shown) on the first print engine 602 into the duplexed Memjet™ printhead assembly. Two Memjet™ print engines 602 and 603 are mounted in a directly opposing configuration along the straight paper path. The paper 604 is drawn into the first print engine 602 by the powered pick-up rollers 626 where the position and size of the paper 604 is sensed and full bleed printing commences.

Fixative is printed simultaneously to aid drying in the shortest possible time.

The Memjet™ print engines 602 and 603 include a rotary capping, blotting and platen device. The capping device seals the Memjet™ printheads when not in use. It uncaps and rotates to produce an integral blotter, which is used for absorbing ink fired from the printheads during routine printer startup maintenance. It simultaneously moves an internal capping device inside the Memjet™ printhead that allows air to flow into the protective nozzle shield area. The third rotation of the device moves a platen surface into place, which supports one side of the sheet 604 during printing.

As shown in FIGS. 4, 5 and 6, the paper 604 passes from the duplexed print engines 602 and 603, into the binder assembly 605. As the sheet 604 passes through the glue strip assembly 673, a retractable stop 706 periodically extends into the paper path for temporarily stopping the page to allow the glue sponge strip to apply a line of adhesive to one horizontal edge on the front side (apart from the first sheet of a document). The retractable stop 706 retracts once the glue strip has applied adhesive to the page such that the page is gravity fed to a binding area where each page is sequentially adhered to the previous page.

FIGS. 8 to 13 show the glue strip assembly in detail. It has a molded glue strip housing 683, a sponge glue strip 681 on the front and a glue hose 641 that runs the length of the molding 683 and exits from one side. The glue hose 641 has a series of holes along its length to provide glue to the glue strip 681. When not in use, the glue strip housing 683 is covered by identical upper and lower lids 679 and 680 respectively. The lids are pivoted in hinge blocks 684 attached to the metal support beam 674. Springs 685 close the lids together to form a seal around the sponge glue strip 681 to prevent any significant deterioration of the glue when the glue strip assembly 673 is not in use.

Figure 10:
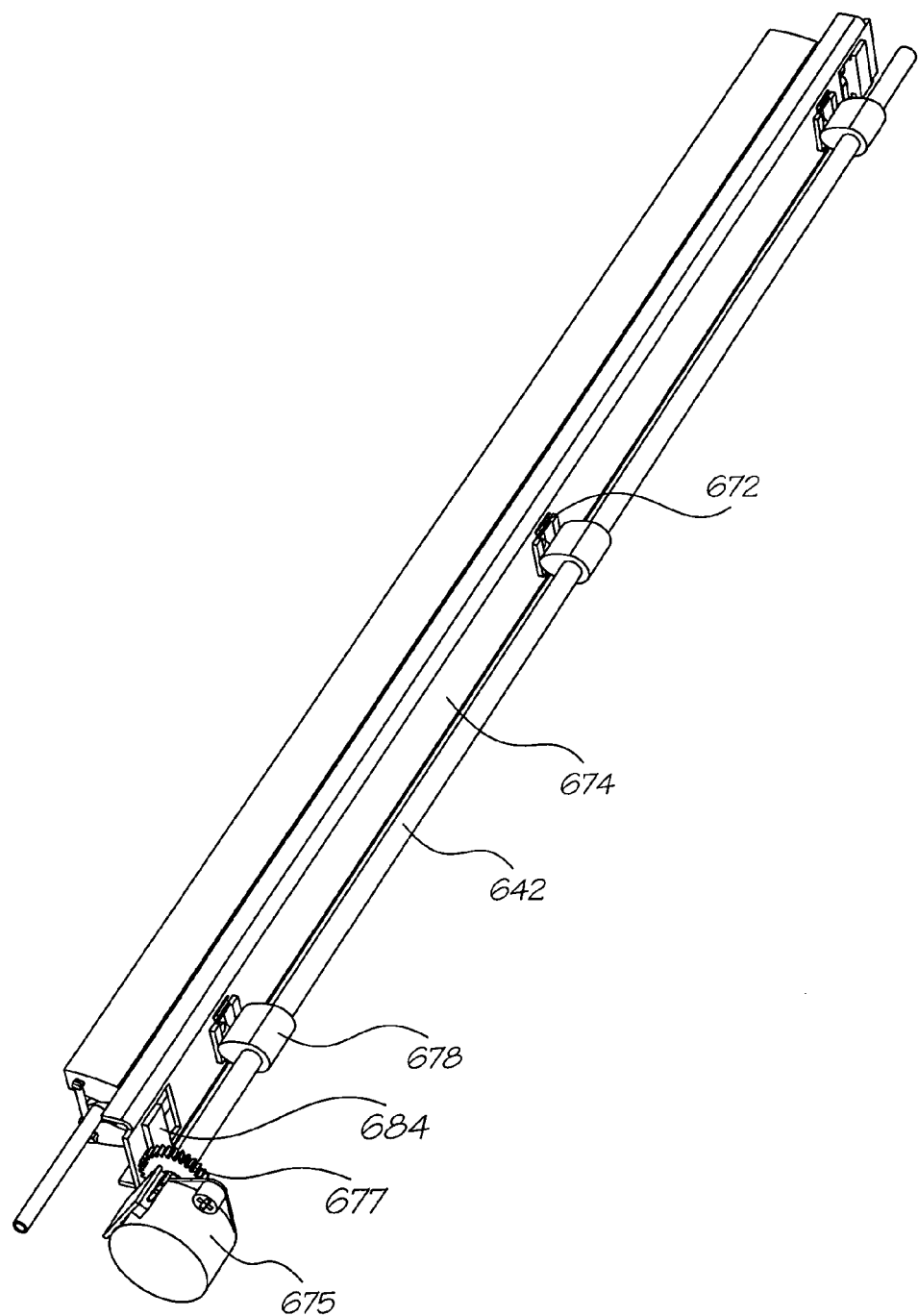
FIG. 10 is a rear three quarter view of the open glue strip assembly in isolation.
Figure 11:
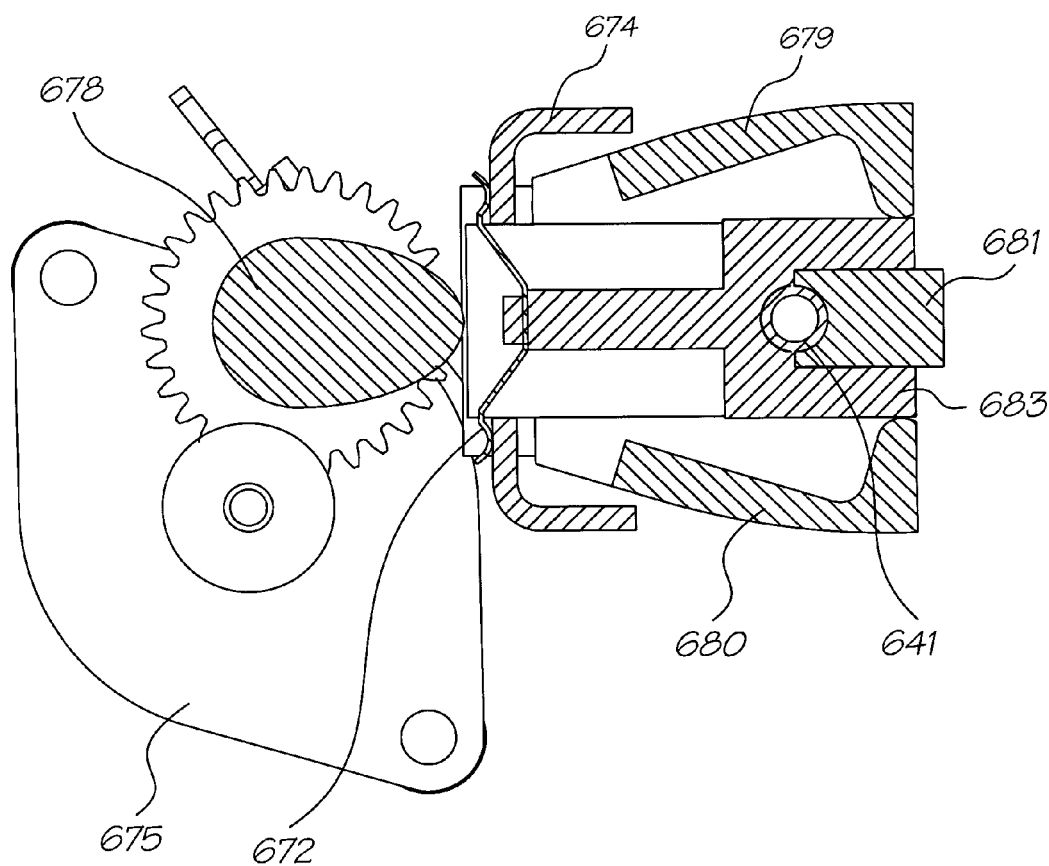
FIG. 11 shows a section on centre of the glue strip assembly.
Figure 12:
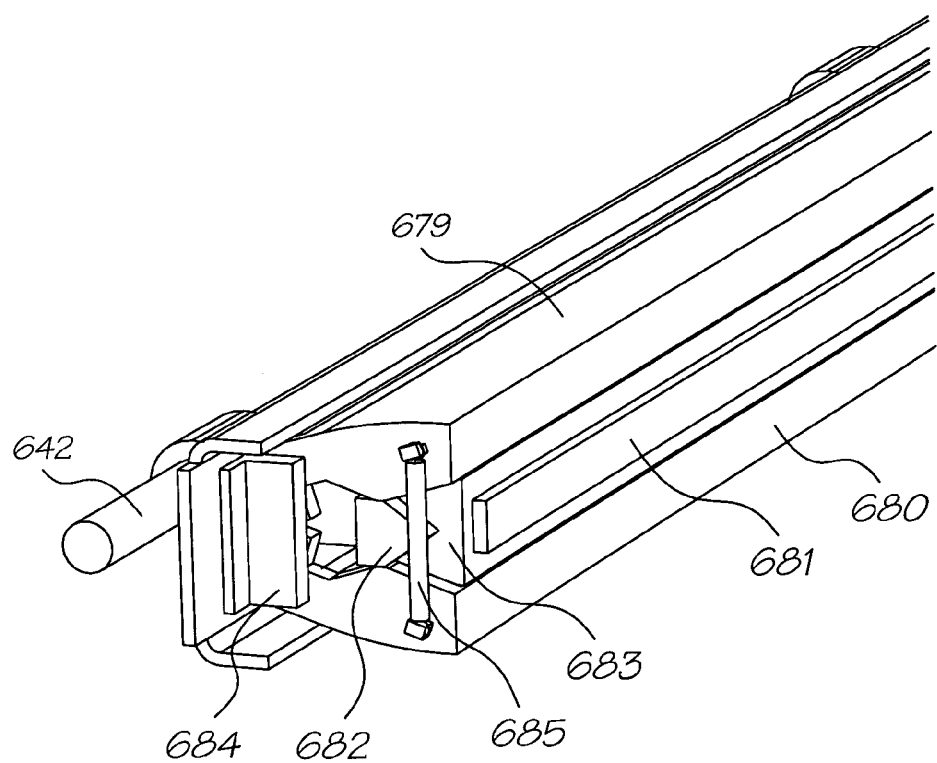
FIG. 12 is an end three quarter view of the open glue strip assembly in isolation.
Figure 13:
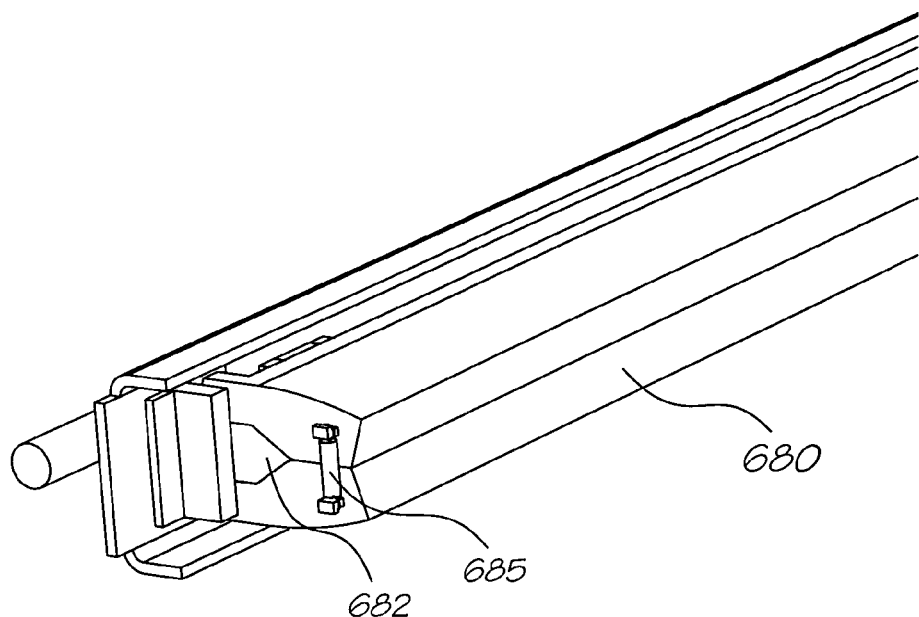
FIG. 13 is an end three quarter view of the closed glue strip assembly in isolation.

When the camshaft 642 is activated, the glue strip housing 683 is pushed forward. A wedge feature 682 on the side of the housing 683 forces the lids 679 and 680 open to allow the glue strip 681 to contact the printed page (not shown). As shown in FIG. 10, metal strip return springs 672 joining the glue strip housing 683 and the support beam 674. The return springs 672 return the housing 683 to the inoperative position as the lids 679 and 680 automatically enclose the glue strip 681.

It will be appreciated that this arrangement allows the media tray, binding station and collection station can be arranged in "landscape" orientation (short sides parallel to paper movement) to shorten the length of the printer. This provides a relatively compact design that can more easily fit into environments having limited space.

Figure 7:
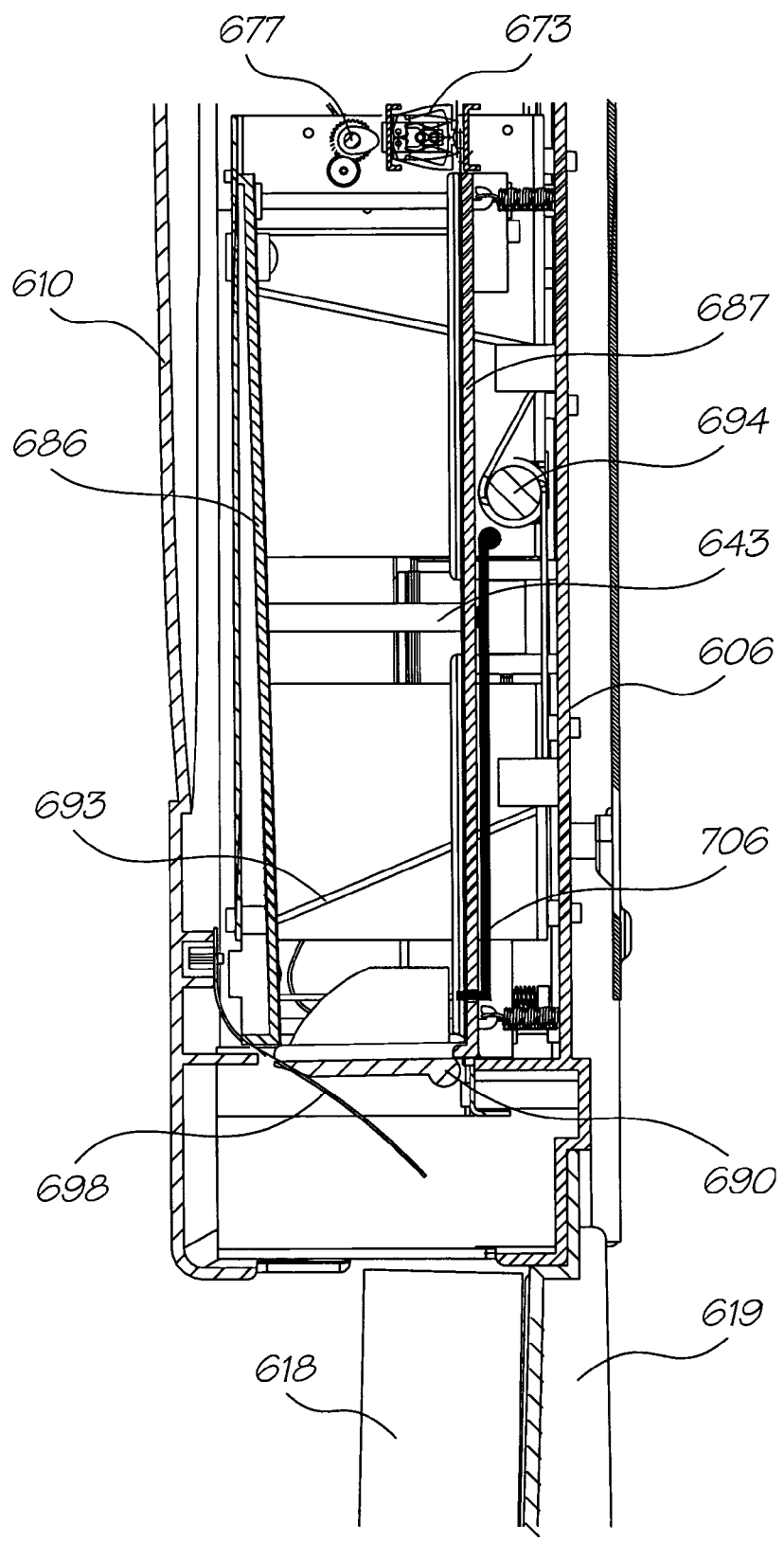
FIG. 7 shows an enlarged section view of the lower part of the wallprinter.
Figure 8:
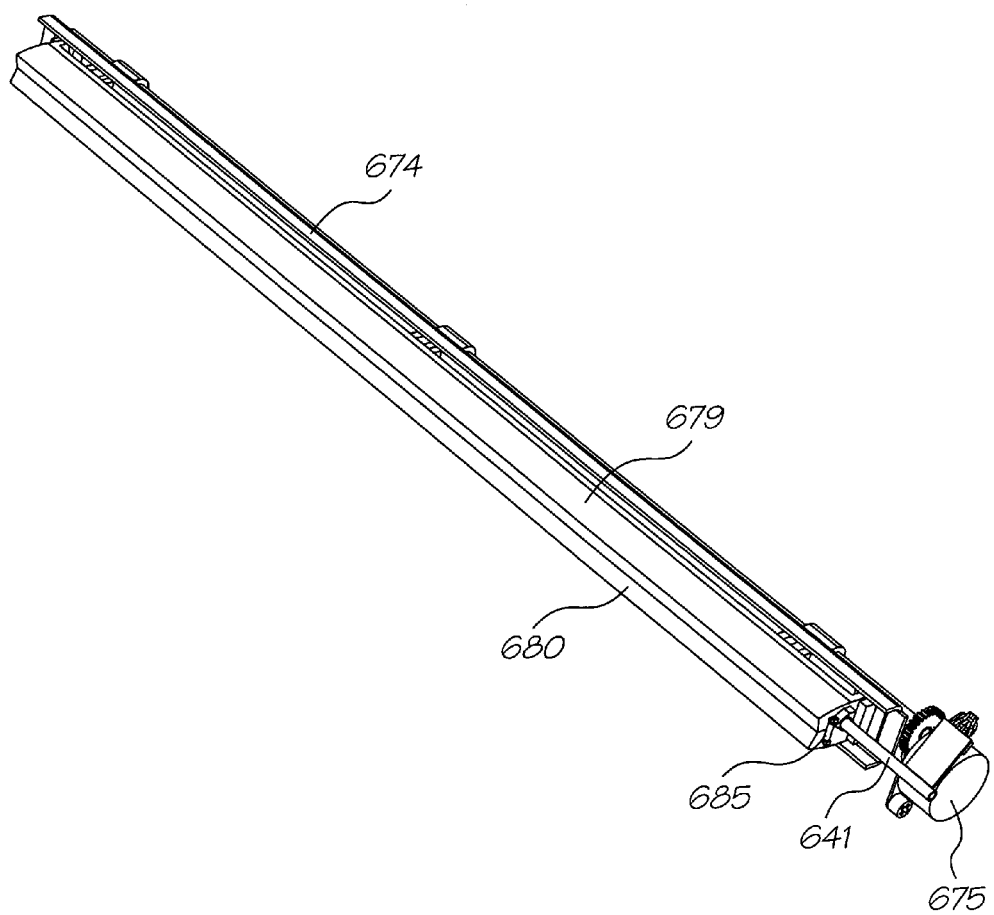
FIG. 8 is a front three quarter view of the closed glue strip assembly in isolation.
Figure 9:
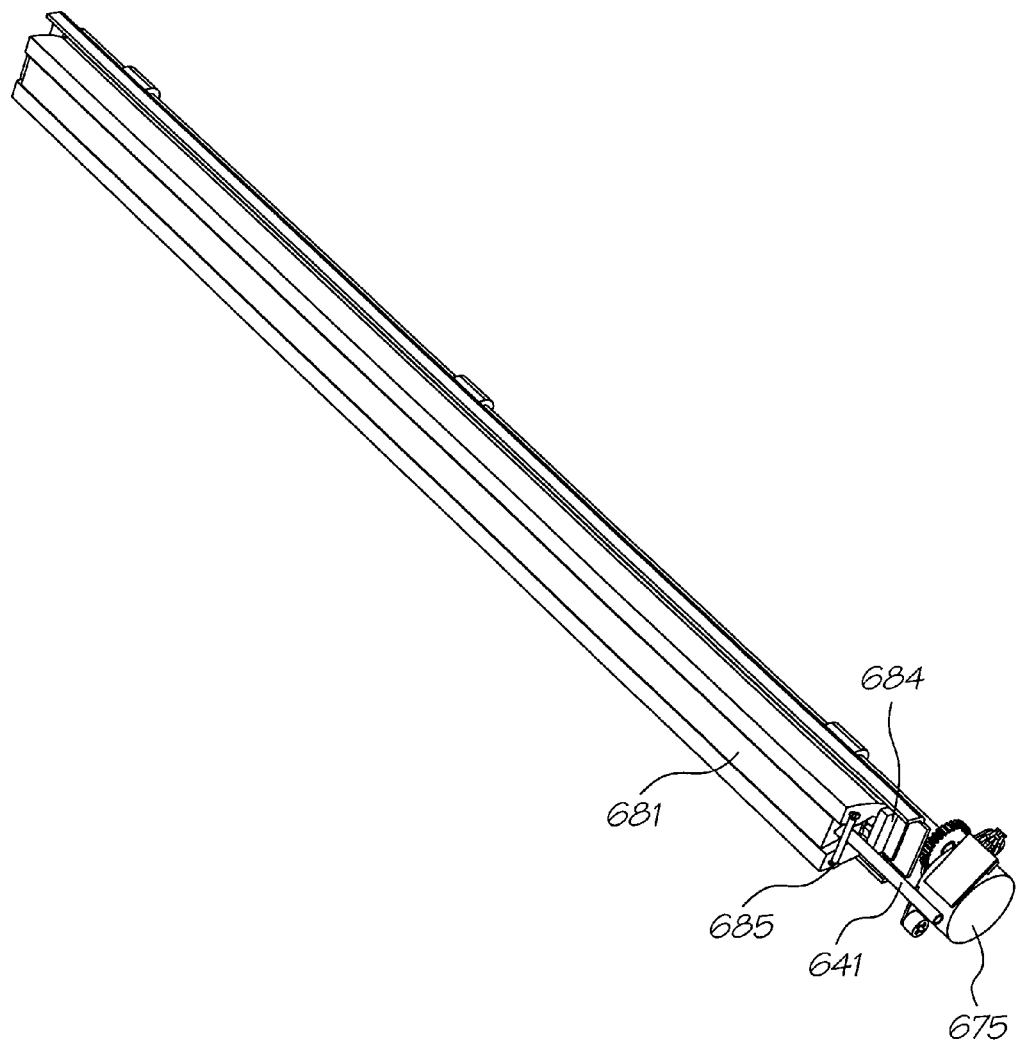
FIG. 9 is a front three quarter view of the open glue strip assembly in isolation.

The "landscape" binder assembly 605 is best shown in FIG. 7. It has a metal support chassis 686, a sprung molded binding platen 687 that runs on four traverser rods, a molded angled platen which supports the document 618 after the sheet 604 has been moved across, and an exit hatch 690. The printed page 604 is fed in until it rests on the exit hatch 690. The binding platen is propelled forward at high speed via a looped system of wheels and a sprung steel cable 693 that attaches to a powered cable winder shaft 694. As the cable winder shaft 694 is rotated, the cable loop 693 shortens and transports the binding platen forward. This powered shaft 694 has a slip clutch mechanism and provides the necessary speed to push the sheet 604 forward onto the rear of a previous sheet, glue/bind it then return under the action of return springs to the home position to accept the next printed sheet. A single operating cycle of the reciprocating platen takes less than 2 seconds.

The cable 693 is sprung to allow for positive pressure to be applied to the previous sheet to aid binding. Furthermore, the angled platen is shallower at the top than at the base in order to support the document 618 in an over axis configuration.

A paper tapper 643 knocks the sheet 604 to one side of the binder assembly 605 as it is transported across to the angled platen. The main PCB 612 controls motors for the cable winder shaft 694, the tapper 643 and the exit hatch 690.

When a document 618 is bound and finished, the powered exit hatch 690, which includes a tamper sensor, opens. The tapper 643 also tap aligns the printed document 618 during ejection out of the binder assembly 605 into the collection tray 619. Plastic foils 698 on the lower front molding 610 work together with the hatch 690 to direct the finished document 618 to the back of the collection tray 619 and feed any further documents into the tray without hitting existing ones. The collection tray 619 is molded in clear plastic and pulls out of its socket under a certain loading. Access for removing documents is provided on three sides.

The invention has been described herein with reference to the specific examples only. Skilled workers in this field will readily recognise many variations and modifications, which do not depart from the spirit and scope of the broad inventive concept.

The invention claimed is:

1. A printer including:
   a housing including one or more fixtures for mounting the housing to a wall;
   a pagewidth printhead assembly disposed within the housing and a binding assembly disposed within the housing downstream of the printhead assembly, the binding assembly comprising
   a support chassis downstream of a printing zone of the printer, the support chassis defining a glue application and binding zone in which printed sheets of media are received in a feed direction; and
   an elongate glue applicator mounted on the chassis and positioned substantially at right angles to said feed direction, the applicator being displaceable towards and away from the sheets of media to apply a strip of glue to a transverse edge of each of said consecutive sheets of media.

2. A printer as claimed in claim 1, which includes a stopping mechanism that is mounted on the support chassis, the stopping mechanism being configured to stop consecutive sheets of media in the glue application and binding zone for a predetermined period of time, to permit the glue applicator to apply the strip of glue to said transverse edge of said each consecutive sheet of media during said predetermined time.

3. Printer as claimed in claim 1, in which the glue applicator includes an elongate housing with an application sponge positioned in the housing and a glue supply, the application sponge being in fluid contact with the glue supply so that glue is drawn into the sponge with a capillary action and the application sponge being positioned so that, when the glue applicator moves towards the sheets of media, the application sponge makes contact with the sheets of media to apply the glue to the sheets of media.

4. Printer as claimed in claim 1, which includes a binding platen assembly mounted to the support chassis, the binding platen assembly being positioned downstream of the glue applicator to receive each sheet of media once the strip of glue has been applied to each sheet and to urge the sheets together so that the glue can act to bind the sheets.

5. Printer as claimed in claim 4, in which the binding platen assembly includes a reciprocating platen and a support platen, the reciprocating platen being interposed between the glue applicator and the support platen and being reciprocally displaceable towards and away from the support platen to receive consecutive sheets of media with the glue applied to the sheets and to transfer the sheets on to the support platen such that the reciprocating platen serves to urge the sheets together.

* * * * *